(12) United States Patent
Emoto et al.

(10) Patent No.: US 7,544,020 B2
(45) Date of Patent: Jun. 9, 2009

(54) PIN MILLING CUTTER

(75) Inventors: Shigenori Emoto, Itami (JP); Akio Nakamura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/567,453

(22) Filed: Dec. 6, 2006

(65) Prior Publication Data
US 2007/0147966 A1 Jun. 28, 2007

(30) Foreign Application Priority Data
Dec. 8, 2005 (JP) ............... 2005-354966

(51) Int. Cl.
*B23C 3/06* (2006.01)
(52) U.S. Cl. ............... 407/34; 407/56; 82/106; 409/234
(58) Field of Classification Search ............ 407/33–36, 407/51, 56, 39, 43, 58, 60, 61, 53, 55; 82/106; 409/232, 234; *B23C 3/06*
See application file for complete search history.

(56) References Cited

U.S. PATENT DOCUMENTS

| | | | | |
|---|---|---|---|---|
| 3,242,553 A | * | 3/1966 | Bogsten | 407/41 |
| 5,667,343 A | * | 9/1997 | Hessman et al. | 407/36 |
| 6,068,430 A | * | 5/2000 | Saeki et al. | 407/12 |
| 6,125,522 A | * | 10/2000 | Nakasuji | 29/458 |
| 6,227,083 B1 | * | 5/2001 | Tseng | 82/113 |
| 6,276,880 B1 | * | 8/2001 | Cirino et al. | 409/234 |
| 2005/0016483 A1 | * | 1/2005 | Ogawa | 123/90.17 |

FOREIGN PATENT DOCUMENTS

| | | | |
|---|---|---|---|
| FR | 2902374 A1 | * | 12/2007 |
| JP | 07226252 A | * | 8/1995 |
| JP | 2861828 B2 | | 2/1999 |
| JP | 2004-283934 A | | 10/2004 |
| JP | 2004-283935 A | | 10/2004 |
| JP | 2004-314194 A | | 11/2004 |

* cited by examiner

*Primary Examiner*—Boyer D Ashley
*Assistant Examiner*—Sara Addisu
(74) *Attorney, Agent, or Firm*—Ditthavong, Mori & Steiner, P.C.

(57) ABSTRACT

The present invention provides a pin milling cutter formed by combining a cutter and an adapter to prevent errors in attaching a cutter to the adapter even when the cutter is similar but of a different type and even if the engagement section between the cutter and the adapter are the same. A mounting error prevention mechanism is provided on a main cutter unit and an adapter to prevent an erroneous combination of a cutter and adapter from fitting together normally. The mounting error prevention mechanism includes: a projection and a cavity corresponding to the main cutter unit and the adapter and providing a tapered fit; and a projection and a corresponding groove. The projection can be inserted into the groove only when the cutter and the adapter are combined correctly.

12 Claims, 8 Drawing Sheets

PIN MILLING CUTTER

INCORPORATION BY REFERENCE

The present application claims priority under 35 U.S.C. §119 to Japanese Patent Application No. 2005-354966 filed on Dec. 8, 2005. The content of the application is incorporated herein by reference in its entirety.

BACKGROUND OF THE INVENTION

1. Field of the Invention

The present invention relates to a pin milling cutter for crank shafts in which a cutter and adapter are combined.

2. Description of the Background Art

Examples of pin milling cutters include the ones disclosed in Japanese Patent Publication Number 2861828, Japanese Laid-Open Patent Publication Number 2004-283934, Japanese Laid-Open Patent Publication Number 2004-283935, and Japanese Laid-Open Patent Publication Number 2004-314194.

The pin milling cutters disclosed in Japanese Patent Publication Number 2861828, Japanese Laid-Open Patent Publication Number 2004-283934, Japanese Laid-Open Patent Publication Number 2004-283935, and Japanese Laid-Open Patent Publication Number 2004-314194 are all formed by combining a ring-shaped cutter with cutting sections formed on the inner perimeter with an adapter on the outer perimeter of which the ring-shaped cutter is positioned. In the cutter, a replaceable cutting edge insert is mounted on the inner perimeter of a main cutter body, and an edge of the insert forms the cutting section. Also, multiple tapered splines are formed on the outer perimeter surface of the main cutter body in the along the circumference and at a fixed pitch. The tapered splines, which are formed with diminished width toward the front (relative to the direction in which the cutter is inserted to the adapter), are inserted into corresponding spline grooves formed on the inner perimeter surface of the adapter, thus allowing the cutter to fit concentrically with the adapter. A clamper with a partial disc shaped clamp plate is used for securing so that the cutter can be removably mounted on the adapter.

Because of the diversity of user needs, cutting operations performed with pin milling cutters can often involve cutting multiple workpieces with similar dimensions and shapes in a single workplace. In the production lines of car manufacturers, a specially assigned operator from a specialized division generally performs the replacement of inserts when an insert has reached the end of its lifespan. However, when inserts with similar shapes are present in a cutter which has had its cutting edge replaced, an inappropriate cutter may be installed on an adapter by mistake. This will result in all the cut parts being defective.

In pin milling cutters formed with intermeshing tapered splines and tapered grooves on the cutter and the adapter, the fitting precision of the intermeshing sections (the tapered fitting sections) is often maintained through gauge inspections due to the requirements of repetitive production. While cutters with high-precision engagement sections can prevent inappropriate combinations of cutters and adapters by using different widths, outer diameters, and shapes for the tapered splines and spline grooves, using this method will increase the number of types of engagement sections and will lead to issues such as the inconvenience of gauge inspections, production costs, and administration.

The object of the present invention is to prevent mistakes in the attachment of cutters to adapters even if different types of cutters are similar and even if the engagement sections of these cutters and adapters are the same.

SUMMARY OF THE INVENTION

In order to overcome these problems, the present invention provides an improvement for a pin milling cutter for cutting crankshafts wherein a cutter has a cutting section on an inner perimeter or an outer perimeter of a ring-shaped main cutter body. Further, an adapter supporting the cutter, along with the cutting section, are formed with engagement projections and cavities aligned to each other and positioned at mutually fitting sections at a fixed pitch along a circumference, the engagement projections and cavities provide a tapered fitting so that the cutter and the adapter can be concentrically removably combined. In the present invention, the pin milling cutter is formed so that a mounting error preventing mechanism is provided on the main cutter body and the adapter to prevent the cutter and the adapter from being fitted to each other incorrectly, e.g., at a mistaken position.

Pin milling cutters include internal pin milling cutters with cutting sections on the inner perimeter side of the ring-shaped main cutter body and external pin milling cutters with cutting sections on the outer perimeter side of the main cutter body. Cutters are installed on the inner perimeter side of the adapter in internal pin milling cutters and on the outer perimeter side of the adapter in external pin milling cutters. Thus, with internal pin milling cutters, the outer perimeter surface of the main cutter body and the inner perimeter surface of the adapter serve as the mutually fitting sections described above. With external pin milling cutters, the outer perimeter surface of the adapter and the inner perimeter surface of the main cutter body serve as the mutually fitting sections.

The engagement cavity and projection of the cutter and adapter can be a combination of a tapered spline and a spline groove as described above in Japanese Patent Publication Number 2861828, Japanese Laid-Open Patent Publication Number 2004-283934, Japanese Laid-Open Patent Publication Number 2004-283935, and Japanese Laid-Open Patent Publication Number 2004-314194.

In an embodiment, the mounting error preventing mechanism of the present invention can be formed as a radial projection and a groove corresponding to this projection. In another embodiment, the projection can be a removable cap screw or a removable pin.

Either the projection or the groove is formed on the fitting section on the cutter side while the remaining element is formed on the fitting section on the adapter side. The groove can be a groove extending all the way from a first surface to a second surface of the main cutter body or the adapter.

Also, the object of the mounting error preventing mechanism can be achieved with just one projection and just one groove formed at corresponding positions. However, a single projection and a plurality of grooves formed at a pitch. The pitch at the engagement section can be formed as described above or an integer multiple thereof.

With the pin milling cutter of the present invention, the mounting error preventing mechanism prevents the cutter and the adapter from being fitted if a bad combination of cutter and adapter is used. Thus, even if the engagement sections of the cutter and adapter are standardized, mounting errors are prevented, eliminating the need to use a method that is disadvantageous in terms of effort, costs, maintenance, and the like.

The mounting error preventing mechanism is formed as a corresponding projection and groove to keep the structure simple and to allow the machining and installation of the mechanism to be performed easily.

The use of removable cap screw or pin for the projection makes it possible for the projection attached to the adapter to be replaced with one for grooves having a fitting section with a different size. Also, by changing the attachment position of the projection, the same adapter can be combined with cutters having different specifications. As a result, when the cutter is replaced with one of a different type, the adapter does not need to be replaced, making it possible to standardize the adapter.

In addition, the groove into which the projection is inserted is formed as a groove extending all the way from one surface to the other so that the groove can be easily machined. Also, the use of a single projection and a plurality of grooves formed at a pitch at which the engagement section described above are formed or a pitch that is an integer multiple thereof allows the projection and the grooves forming the mounting error preventing mechanism to fit together even when the engagement positions of the engagement sections of the cutter and the adapter are changed. Thus, the attachment orientation of the cutter to the adapter is not restricted.

DETAILED DESCRIPTION OF THE INVENTION

Figure 1:
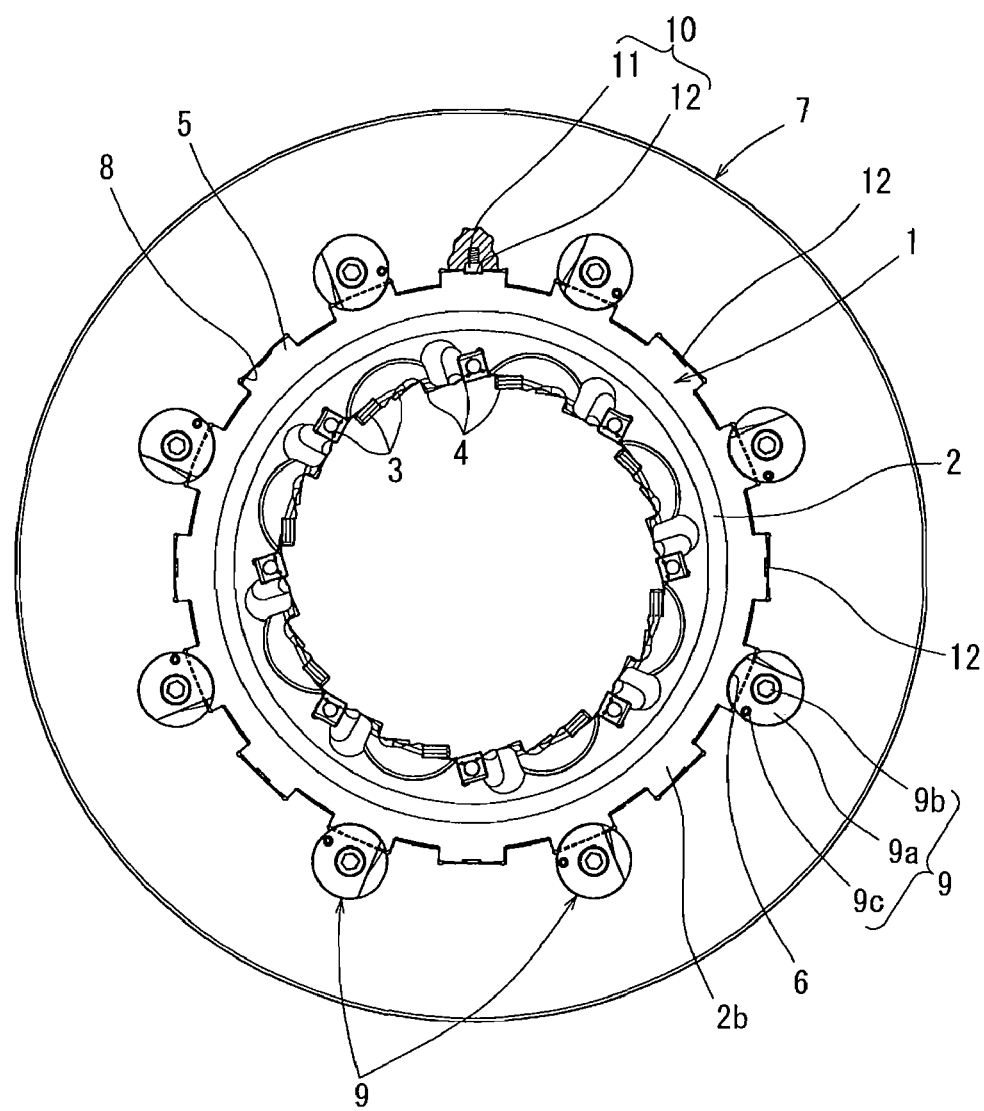
FIG. 1: A partially cut-away front-view drawing of an embodiment of a pin milling cutter according to the present invention.
Figure 2:
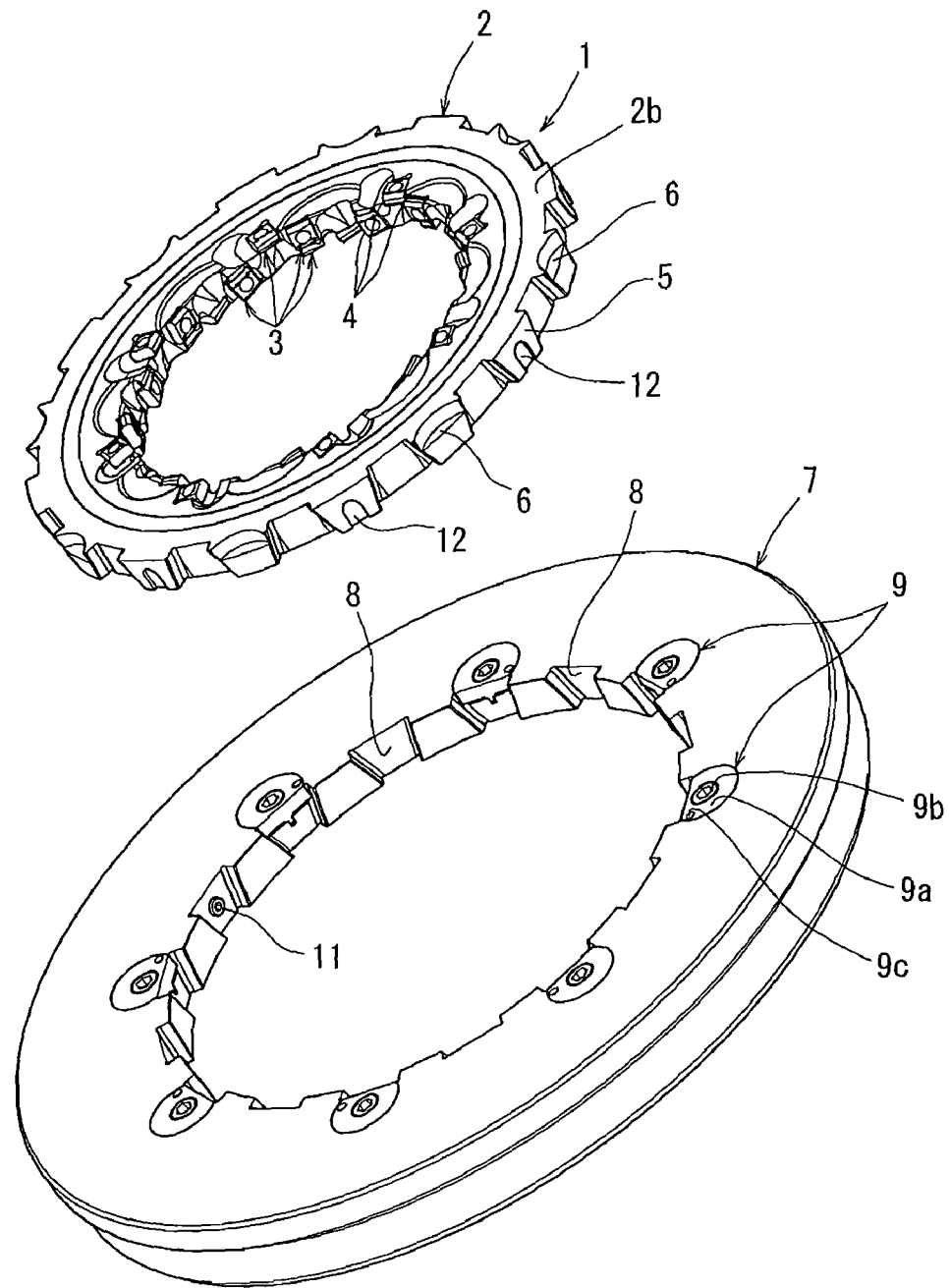
FIG. 2: An exploded perspective drawing of the pin milling cutter from FIG. 1.
Figure 3:
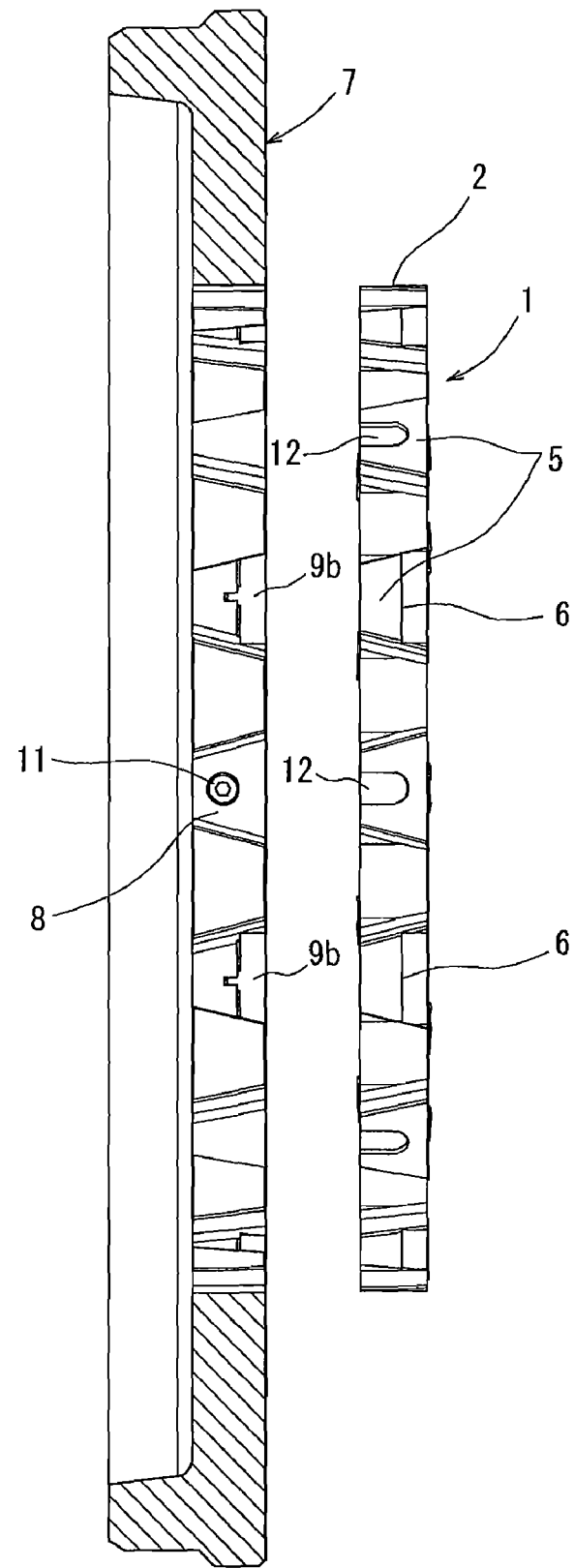
FIG. 3: A cross-section drawing of the pin milling cutter from FIG. 1.
Figure 4:
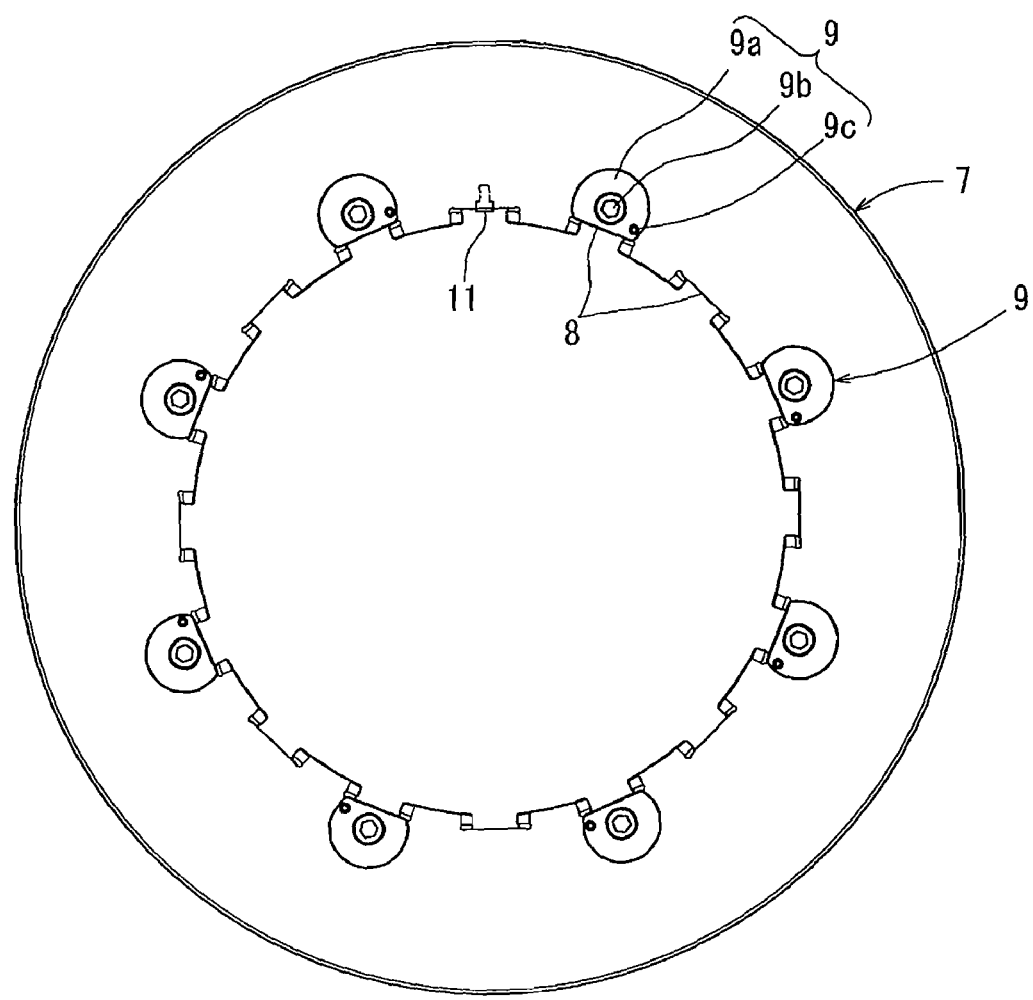
FIG. 4: A front-view drawing of an adapter of the pin milling cutter from FIG. 1.
Figure 5:
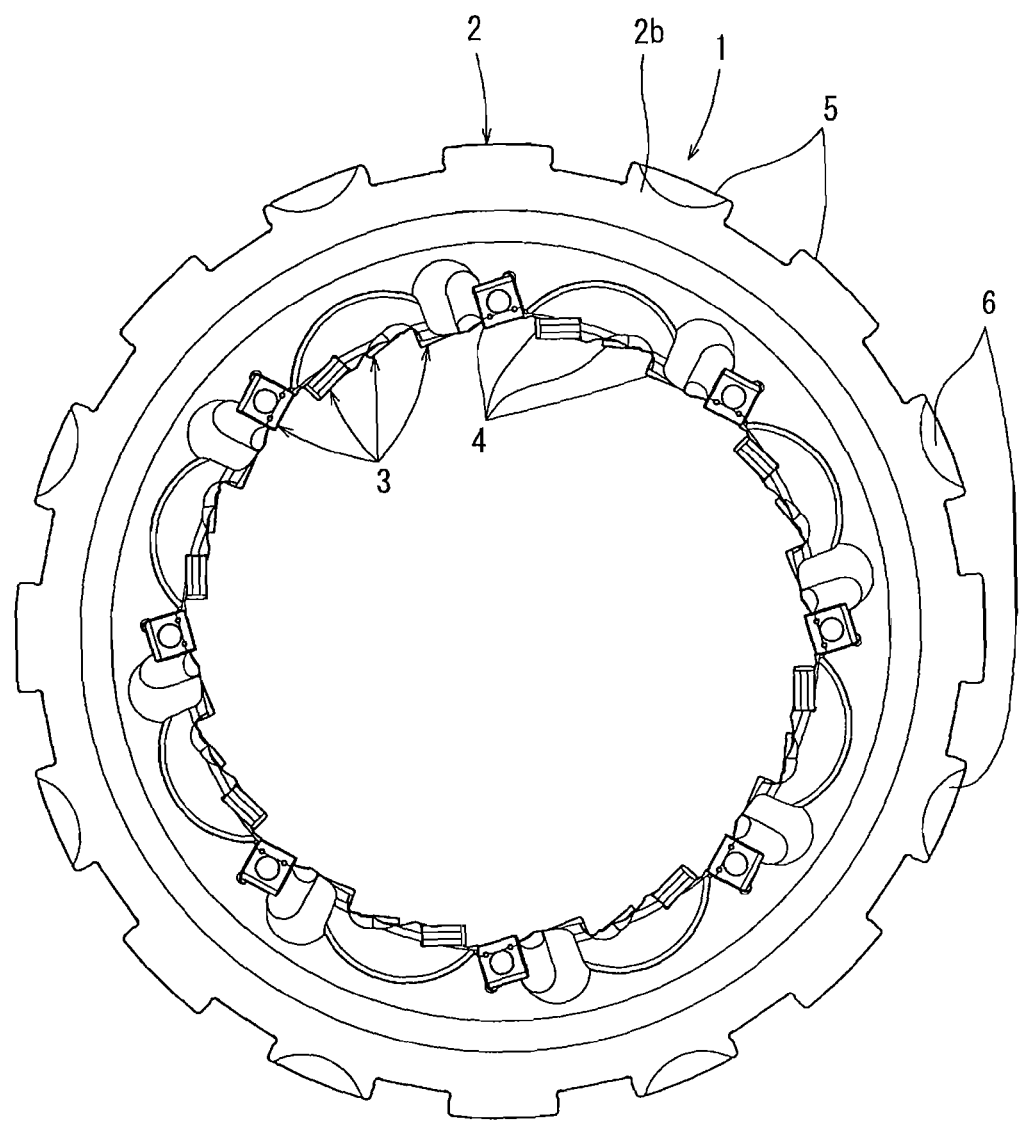
FIG. 5: A side-view drawing of a cutter of the pin milling cutter from FIG. 1.
Figure 6:
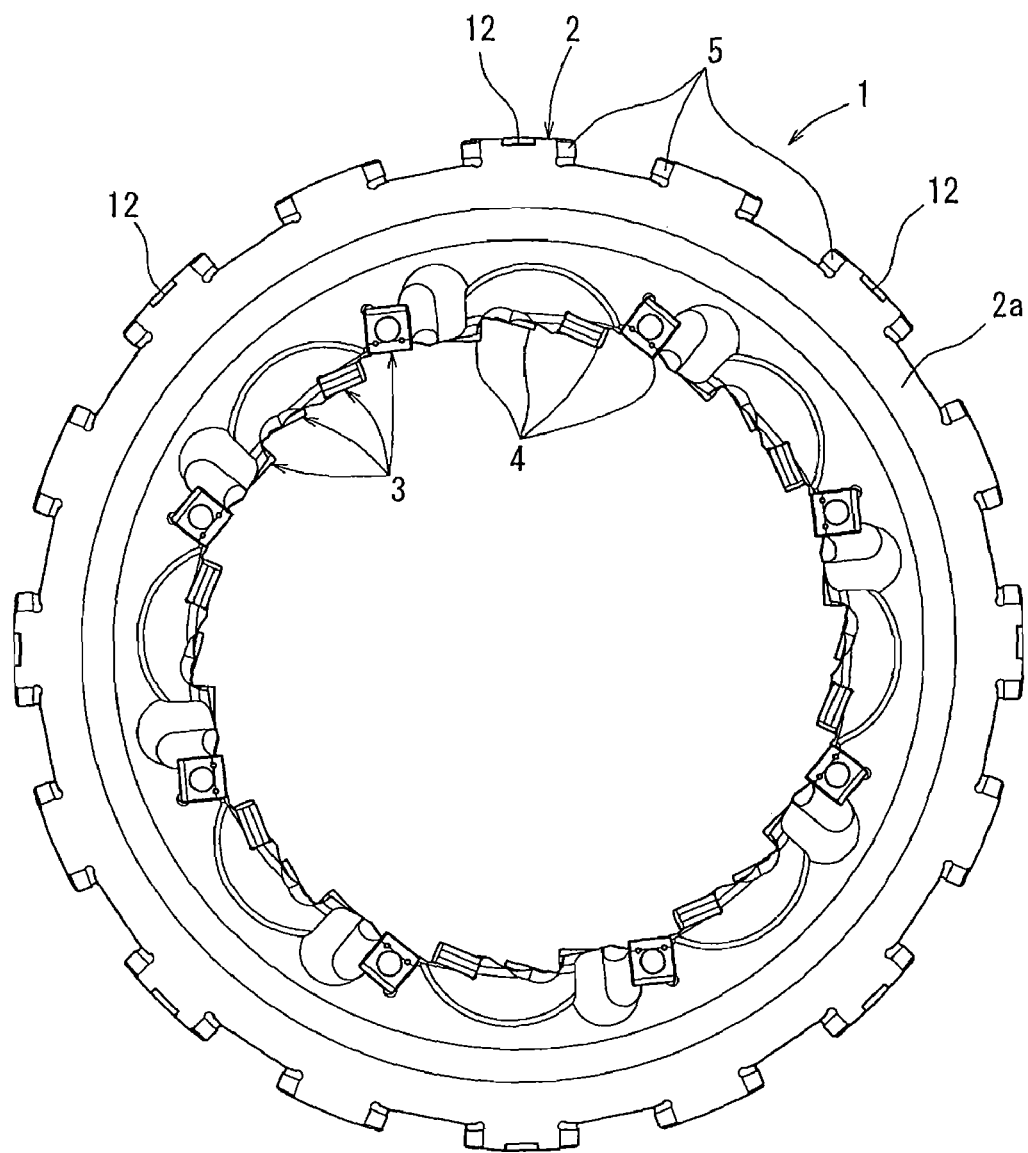
FIG. 6: A side-view drawing seen from the opposite side from FIG. 5 of a cutter of the pin milling cutter from FIG. 1.
Figure 7:
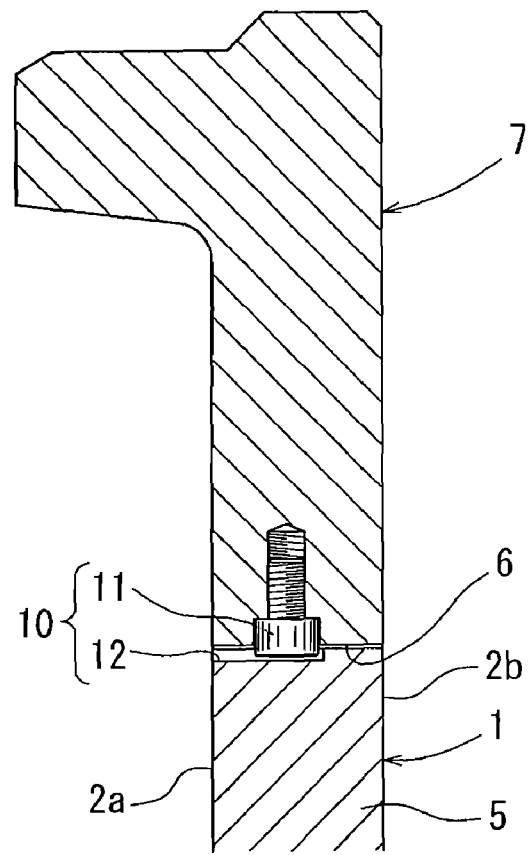
FIG. 7: A cross-section drawing showing the engagement between a projection and a groove forming a mounting error preventing mechanism.
Figure 8:
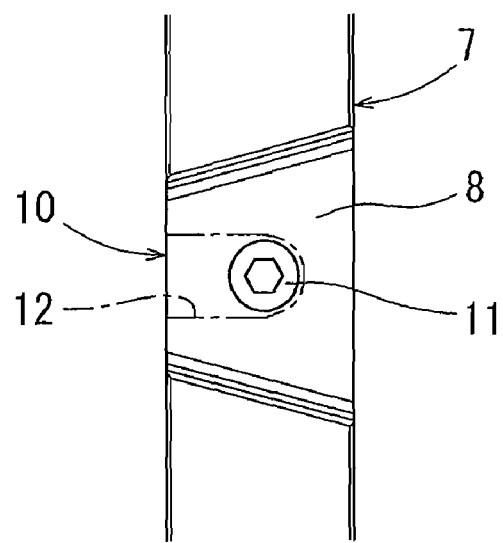
FIG. 8: A drawing showing an example of a combination of a projection and a groove forming a mounting error preventing mechanism.
Figure 9:
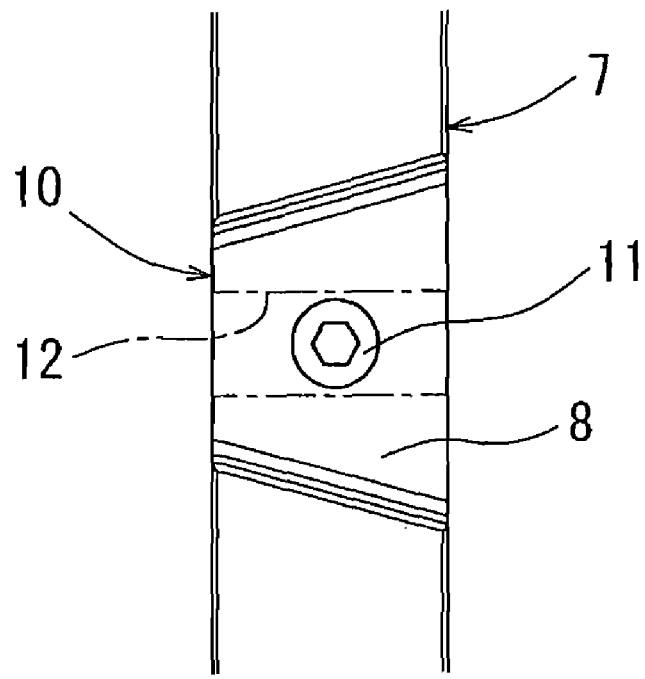
FIG. 9: A drawing showing another example of a combination of a projection and a groove forming a mounting error preventing mechanism.

Referring to FIG. 1 through FIG. 10, the embodiments of the pin milling cutter of the present invention will be described. The cutter of this example in an internal pin milling cutter and includes a cutter 1 and an adapter 7. The inner diameter of the cutter 1 is fitted and supported by the adapter 7. The cutter 1 is formed with a ring-shaped main cutter body 2, and replaceable cutting edge inserts 3 are mounted on the inner perimeter side thereof. The edges of the inserts 3 form cutting sections 4. The replaceable cutting edge inserts 3 are used in combination so that multiple inserts work together on the region of the crank shaft to be cut. Edges damaged from cutting are switched, and when all edges that can serve as cutting sections 4 have been used, replacement is performed.

Projections 5 are formed at a fixed pitch along the outer perimeter of the main cutter body 2 and are projected outward to engage with the adapter 7. In one embodiment, the projections 5 can be tapered splines, as shown in the figures, that narrow in the direction that the cutter is inserted into the adapter 7. Spines provide a high degree of fitting precision with the adapter 7.

At every other projection 5, a base groove 6 is formed on a side surface 2b at the rear (relative to the direction in which the cutter is inserted to the adapter), and a partial disc shaped clamp plate 9a of a clamper 9, described later, engages with the base groove 6.

Cavities (spline grooves) 8 corresponding to the projections 5 on the cutter are formed on the inner perimeter surface of the adapter 7 at the same pitch and with the same number as the projections 5. Also, clampers 9 for securing the cutter 1 to the adapter 7 are formed on the sections where every other cavity (spline groove) is formed on one side of the adapter 7. In an embodiment at the clamper 9, superior removability by using the clamper shown in the figure. The clamper 9 can be formed from the partial disc shaped clamp plate 9a, a clamp bolt 9b for securing the partial disc shaped clamp plate 9a, and a stopper 9c preventing, when the clamp bolt 9b is turned, the partial disc shaped clamp plate 9a from turning in tandem. (When tightening the bolt, turning in tandem from the position of engagement with the base groove 6 and, when loosening the bolt, turning in tandem from a position of disengagement from the base groove 6). The engagement of the partial disc shaped clamp plate 9a to the base groove 6 can be released by pivoting the partial disc shaped clamp plate 9a roughly 90 deg around the clamp bolt 9b, allowing the cutter 1 to be attached or removed.

The cutter 1 is installed in the inner diameter side of the adapter 7 by inserting the projections 5 formed on the outer perimeter of the main cutter body 2 into the cavities 8 formed on the adapter 7. The projections 5 and the cavities 8, i.e., the tapered splines and the spline grooves, form a tapered fit with each other, and this tapered fit provides accurate and highly precise centering of the cutter 1 to the center of the adapter 7.

The main characteristic of the present invention is a mounting error preventing mechanism 10 preventing erroneous mountings of the adapter 7 to the cutter 1.

The mounting error preventing mechanism 10 shown, includes a projection 11 formed on the adapter 7 and grooves 12 formed on the main cutter body 2. In the pin milling cutter of this example, there is one projection 11 installed, and this projection 11 is positioned at one of the cavities 8 between the clampers 9, 9. The grooves 12 are formed at the outer perimeter of the main cutter body 2 on a surface on the outer diameter side of the projection 5 where the base groove 6 is not formed. The grooves 12 can be a groove open on the side surface 2a toward the front (relative to the direction in which the cutter is inserted to the adapter) and closed on the other end (see FIG. 8). Alternately grooves 12 can be a groove extending from the side surface 2a to the other side surface 2b of the main cutter body 2 (see FIG. 9). Although the latter groove that extends all the way through is easier to machine, both grooves provide the same functionality for preventing mounting errors.

Figure 10:
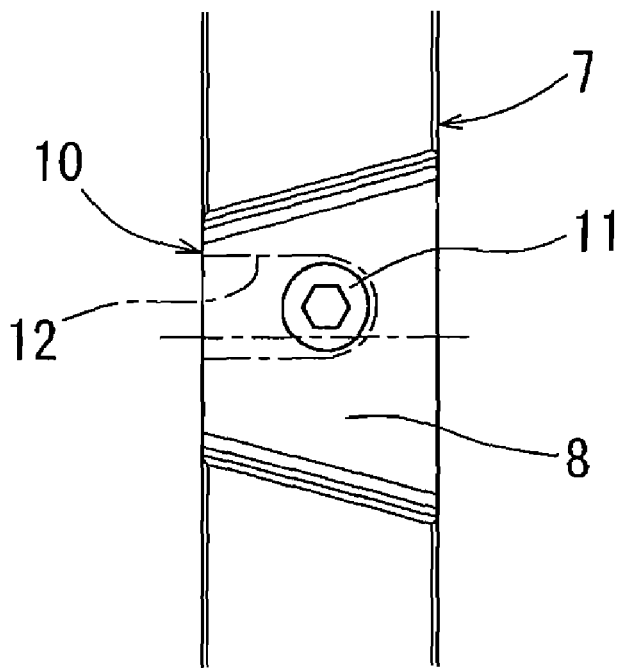
FIG. 10: A drawing showing yet another example of a combination of a projection and a groove forming a mounting error preventing mechanism.

In an embodiment, the projection 11 can be formed as a removable cap screw (e.g., a button bolt with a hexagonal hole or a bolt with a hexagonal hole as shown in the figure) or a removable pin. With a removable projection, the projection 11 attached to the adapter 7 can be replaced with one with grooves 12 having a fitting section with a different size. Also, as shown in FIG. 10, by changing the attachment position of the projection, a single adapter can be combined with cutters having different specifications (a single adapter can be formed with multiple projection attachment holes at different places to allow the projection attachment position to be changed). This makes it possible to eliminate the need to replace the adapter 7 when switching the cutter 1 with a different type of cutter.

Also, in the pin milling cutter, there can be one projection 11 while the grooves 12 are formed on all the projections 5 that are not formed with the base groove 6 on the outer perimeter. Even if the engagement position of the projection 5 and the cavity 8 changes, the projection 11 and the groove 12 forming the mounting error preventing mechanism 10 fit together. As a result, the cutter can be mounted to the adapter without imposing restrictions on the attachment orientation of the cutter 1 to the adapter 7.

Also, in order to provide a smooth fit, the projection 11 and the groove 12 can be formed with a width along the circumference that is greater than the width along the circumference of the projection 11 by approximately 0.1-1.0 mm, and for the depth of the groove 12 to be greater than the projection of the projection 11 by approximately 0.1-1.0 mm.

Also, it can be possible for the relative positioning of the projection 11 and the grooves 12 to be reversed from the arrangement shown in the example, so that the projection 11 is formed on the main cutter body 2 and the grooves 12 are formed on the adapter 7. In another embodiment, a position can be selected that avoids the fitting section of the projection 5 and the cavity 8 and forms the projection 11 and the groove 12 at that location.

Furthermore, the above description presented an internal pin milling cutter, but the present invention can also be implemented for external pin milling cutters as well.

What is claimed is:

1. A pin milling cutter for cutting crankshafts having a cutter with a cutting section on an inner perimeter or an outer perimeter of a ring-shaped main cutter body and an adapter supporting said cutter are formed with engagement projections and cavities aligned to each other and positioned at mutually fitting sections at a fixed pitch along a circumference to provide tapered fitting so that said cutter and said adapter can be removably combined concentrically, comprising:
   a mechanism configured to prevent a different type of cutter from being mistakenly fit to said adapter, said mechanism being disposed on said main cutter body and said adapter, said mechanism comprising one radial projection and a plurality of grooves corresponding to said projection,
   wherein either said radial projection or said groove being formed on a fitting section on a cutter side while a remaining element is formed on a fitting section on an adapter side,
   wherein said plurality of grooves are formed at a pitch at which said engagement projections and cavities are formed or a pitch that is an integer multiple thereof,
   wherein said radial projection is at least one of a removable cap screw or a removable pin, and
   wherein an attachment position of said radial projection on the fitting section can be changed.

2. A pin milling cutter according to claim 1, wherein at least one groove of said plurality of grooves is a groove extending from a first surface to a second surface of at least one of said main cutter body or said adapter.

3. A pin milling cutter according to claim 1, wherein the fitting section having said radial projection is provided with multiple projection attachment holes each being configured to receive said radial projection.

4. A pin milling cutter according to claim 3, wherein said multiple projection attachment holes are provided at different positions on the fitting section.

5. A pin milling cutter for cutting crankshafts, said pin milling cutter comprising:
   a cutter including a ring-shaped main cutter body having a cutter section on an inner perimeter or an outer perimeter thereof, said main cutter body having engagement projections; and
   an adapter configured to support said cutter, said adapter having cavities aligned with said engagement projections and configured to provided tapered fitting so that said cutter and said adapter can be removably combined concentrically,
   wherein at least one engagement projection of said engagement projections includes one radial projection,
   wherein said cavities include grooves configured to receive said radial projection,
   wherein said grooves are formed at a pitch at which said cavities are formed or a pitch that is an integer multiple thereof,
   wherein said radial projection is at least one of a removable cap screw or a removable pin, and
   wherein an attachment position of said radial projection on the at least one engagement projection can be changed.

6. A pin milling cutter according to claim 5 wherein said grooves are each a groove extending from a first surface to a second surface of said adapter.

7. A pin milling cutter according to claim 5, wherein said engagement projections are provided with multiple projection attachment holes each being configured to receive said radial projection.

8. A pin milling cutter according to claim 7, wherein said multiple projection attachment holes are provided at different positions on said engagement projections.

9. A pin milling cutter for cutting crankshafts, said pin milling cutter comprising:
   a cutter including a ring-shaped main cutter body having a cutting section on an inner perimeter or an outer perimeter thereof, said main cutter body having engagement projections; and
   an adapter configured to support said cutter, said adapter having cavities aligned with said engagement projections and configured to provided tapered fitting so that said cutter and said adapter can be removably combined concentrically,
   wherein at least one cavity of said cavities includes one radial projection,
   wherein said engagement projections include grooves configured to receive said radial projection,
   wherein said grooves are formed at a pitch at which said engagement projections are formed or a pitch that is an integer multiple thereof,
   wherein said radial projection is at least one of a removable cap screw or a removable pin, and
   wherein an attachment position of said radial projection on the at least one cavity can be changed.

10. A pin milling cutter according to claim 9, wherein said grooves are each a groove extending from a first surface to a second surface of said main cutter body.

11. A pin milling cutter according to claim 9, wherein said cavities are provided with multiple projection attachment holes each being configured to receive said radial projection.

12. A pin milling cutter according to claim 11, wherein said multiple projection attachment holes are provided at different positions on said cavities.

* * * * *

UNITED STATES PATENT AND TRADEMARK OFFICE
CERTIFICATE OF CORRECTION

PATENT NO. : 7,544,020 B2
APPLICATION NO. : 11/567453
DATED : June 9, 2009
INVENTOR(S) : Shigenori Emoto et al.

It is certified that error appears in the above-identified patent and that said Letters Patent is hereby corrected as shown below:

Title page, item [73] Assignee: should read: Sumitomo Electric Hardmetal Corp.

Signed and Sealed this

Twenty-sixth Day of January, 2010

David J. Kappos
*Director of the United States Patent and Trademark Office*